United States Patent
Chang et al.

(10) Patent No.: US 10,684,724 B1
(45) Date of Patent: Jun. 16, 2020

(54) IN-CELL TOUCH PANEL SENSING SYSTEM AND SENSING METHOD FOR THE IN-CELL TOUCH PANEL SENSING SYSTEM

(71) Applicant: HIMAX TECHNOLOGIES LIMITED, Tainan (TW)

(72) Inventors: Yaw-Guang Chang, Tainan (TW);
Hui-Min Wang, Tainan (TW);
Ren-Hao Ye, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/262,843

(22) Filed: Jan. 30, 2019

(51) Int. Cl.
*G06F 3/041* (2006.01)

(52) U.S. Cl.
CPC ................. *G06F 3/0416* (2013.01)

(58) Field of Classification Search
CPC ............. G06F 3/0416; G06F 3/04164
USPC ........................................... 345/173
See application file for complete search history.

(56) References Cited

U.S. PATENT DOCUMENTS

| | | | |
|---|---|---|---|
| 2015/0049044 A1* | 2/2015 | Yousefpor | G06F 3/0418 345/174 |
| 2015/0309661 A1* | 10/2015 | Kim | G06F 3/0412 345/174 |
| 2016/0092010 A1* | 3/2016 | Agarwal | G06F 3/0412 345/173 |
| 2017/0212626 A1 | 7/2017 | Zhao | |
| 2018/0059868 A1* | 3/2018 | Brahma | G06F 3/0418 |
| 2018/0107292 A1 | 4/2018 | Jang | |

FOREIGN PATENT DOCUMENTS

| | | |
|---|---|---|
| CN | 104407760 A | 3/2015 |
| TW | 201042525 A1 | 12/2010 |
| TW | 201624248 A | 7/2016 |
| TW | 201704939 A | 2/2017 |

* cited by examiner

*Primary Examiner* — Mark Edwards
(74) *Attorney, Agent, or Firm* — Winston Hsu

(57) ABSTRACT

The present invention provides an in-cell touch panel sensing system and a sensing method. The in-cell touch panel sensing system comprises sensing arrays. Each sensing array comprises: sensor plates; a first multiplexer (MUX), a first analog-to-digital converter (ADC), a second MUX, a second ADC, a third MUX, a third ADC, a fourth MUX, and a fourth ADC. The first MUX is coupled to a first row of the sensor plates and a first column of the sensor plates. The first ADC is coupled to the first MUX. The second MUX is coupled to a second row of the sensor plates and a second column of the sensor plates. The third MUX is coupled to a third row of the sensor plates and a third column of the sensor plates. The fourth MUX is coupled to a fourth row of the sensor plates and a fourth column of the sensor plates.

10 Claims, 5 Drawing Sheets

Utilize the first ADC, the second ADC, the third ADC, and the fourth ADC to scan the first column of the sensor plates, the second column of the sensor plates, the third column of the sensor plates, and the fourth column of the sensor plates simultaneously in a first time slot ~500

Utilizing the first ADC, the second ADC, the third ADC, and the fourth ADC scan the first row of the sensor plates, the second row of the sensor plates, the third row of the sensor plates, and the fourth row of the sensor plates simultaneously in a second time slot to complete a position sensing operation once ~510

FIG. 5

IN-CELL TOUCH PANEL SENSING SYSTEM AND SENSING METHOD FOR THE IN-CELL TOUCH PANEL SENSING SYSTEM

BACKGROUND OF THE INVENTION

1. Field of the Invention

The present invention relates to a touch panel sensing system, and more particularly, to an in-cell touch panel sensing system and a sensing method for the in-cell touch panel sensing system.

2. Description of the Prior Art

Please refer to FIG. 1. FIG. 1 shows a simplified block diagram of a conventional in-cell touch panel sensing system 100 in a Touch and Display Driver Integration (TDDI) chip. The in-cell touch panel sensing system 100 comprises 50 sensing arrays 200. The sensing array 200 comprises: 16 sensor plates 211, 212, 213, 214, 221, 222, 223, 224, 231, 232, 233, 234, 241, 242, 243, 244, a first multiplexer (MUX) 250, a first analog-to-digital converter (ADC) 252, a second MUX 260, a second ADC 262, a third MUX 270, a third ADC 272, a fourth MUX 280, and a fourth ADC 282. The first MUX 250 is coupled to a first column of the sensor plates 211, 212, 213, 214. The first ADC 252 is coupled to the first MUX 250. The second MUX 260 is coupled to a second column of the sensor plates 221, 222, 223, 224. The second ADC 262 is coupled to the second MUX 260. The third MUX 270 is coupled to a third column of the sensor plates 231, 232, 233, 234. The third ADC 272 is coupled to the third MUX 270. The fourth MUX 280 is coupled to a fourth column of the sensor plates 241, 242, 243, 244. The fourth ADC 282 is coupled to the fourth MUX 280.

Please refer to FIG. 2. FIG. 2 shows a simplified block diagram of a sensing method of the conventional in-cell touch panel sensing system 100. When the conventional in-cell touch panel sensing system 100 performs a position sensing operation, the first ADC 252, the second ADC 262, the third ADC 272, and the fourth ADC 282 scan a fourth row of the sensor plates 214, 224, 234, 244 respectively via the first MUX 250, the second MUX 260, the third MUX 270, the third ADC 272 in a first time slot. Next, the first ADC 252, the second ADC 262, the third ADC 272, and the fourth ADC 282 scan the third row of the sensor plates 213, 223, 233, 243 in a second time slot. Next, the first ADC 252, the second ADC 262, the third ADC 272, and the fourth ADC 282 scan the second row of the sensor plates 212, 222, 232, 242 in a third time slot. Next, the first ADC 252, the second ADC 262, the third ADC 272, and the fourth ADC 282 scan the first row of the sensor plates 212, 222, 232, 242 in a fourth time slot. In other words, each ADC of the conventional in-cell touch panel sensing system 100 only scans one sensor plate in one time slot. Thus, the conventional in-cell touch panel sensing system 100 requires 4 time slots to complete the position sensing operation for one time with 4 ADC in one sensing arrays 200. If one time slot is 200 ms, then the conventional in-cell touch panel sensing system 100 needs to spend 800 ms to complete the position sensing operation for one time. If there is a requirement for the conventional in-cell touch panel sensing system 100 to complete the position sensing operation with only 2 time slots, then the conventional in-cell touch panel sensing system 100 has to use 8 ADC in each sensing arrays 200 with the above sensing method, which will increase a lot of costs.

SUMMARY OF THE INVENTION

It is therefore one of the objectives of the present invention to provide an in-cell touch panel sensing system and a sensing method for the in-cell touch panel sensing system, so as to solve the above problem.

In accordance with an embodiment of the present invention, an in-cell touch panel sensing system is disclosed. The in-cell touch panel sensing system comprises: a plurality of sensing arrays, and each sensing array comprises: a plurality of sensor plates; a first multiplexer (MUX), a first analog-to-digital converter (ADC), a second MUX, a second ADC, a third MUX, a third ADC, a fourth MUX, and a fourth ADC. The first MUX is coupled to a first row of the sensor plates and a first column of the sensor plates. The first ADC is coupled to the first MUX. The second MUX is coupled to a second row of the sensor plates and a second column of the sensor plates. The second ADC is coupled to the second MUX. The third MUX is coupled to a third row of the sensor plates and a third column of the sensor plates. The third ADC is coupled to the third MUX. The fourth MUX is coupled to a fourth row of the sensor plates and a fourth column of the sensor plates. The fourth ADC is coupled to the fourth MUX.

In accordance with an embodiment of the present invention, a sensing method for the above in-cell touch panel sensing system is disclosed. The sensing method comprises: utilizing the first ADC, the second ADC, the third ADC, and the fourth ADC to scan the first column of the sensor plates, the second column of the sensor plates, the third column of the sensor plates, and the fourth column of the sensor plates simultaneously in a first time slot; and utilizing the first ADC, the second ADC, the third ADC, and the fourth ADC scan the first row of the sensor plates, the second row of the sensor plates, the third row of the sensor plates, and the fourth row of the sensor plates simultaneously in a second time slot to complete a position sensing operation once.

Briefly summarized, the in-cell touch panel sensing system and a sensing method for the in-cell touch panel sensing system disclosed by the present invention can use a smaller amount of ADCs to complete a position sensing operation or reduce number of times of the time slot required in the position sensing operation with same amount of ADCs. Thus, the present invention also can reduce the required time of the position sensing operation.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 show a flowchart of a sensing method for the in-cell touch panel sensing system in FIG. 3 of the present invention.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . ".

Figure 1:
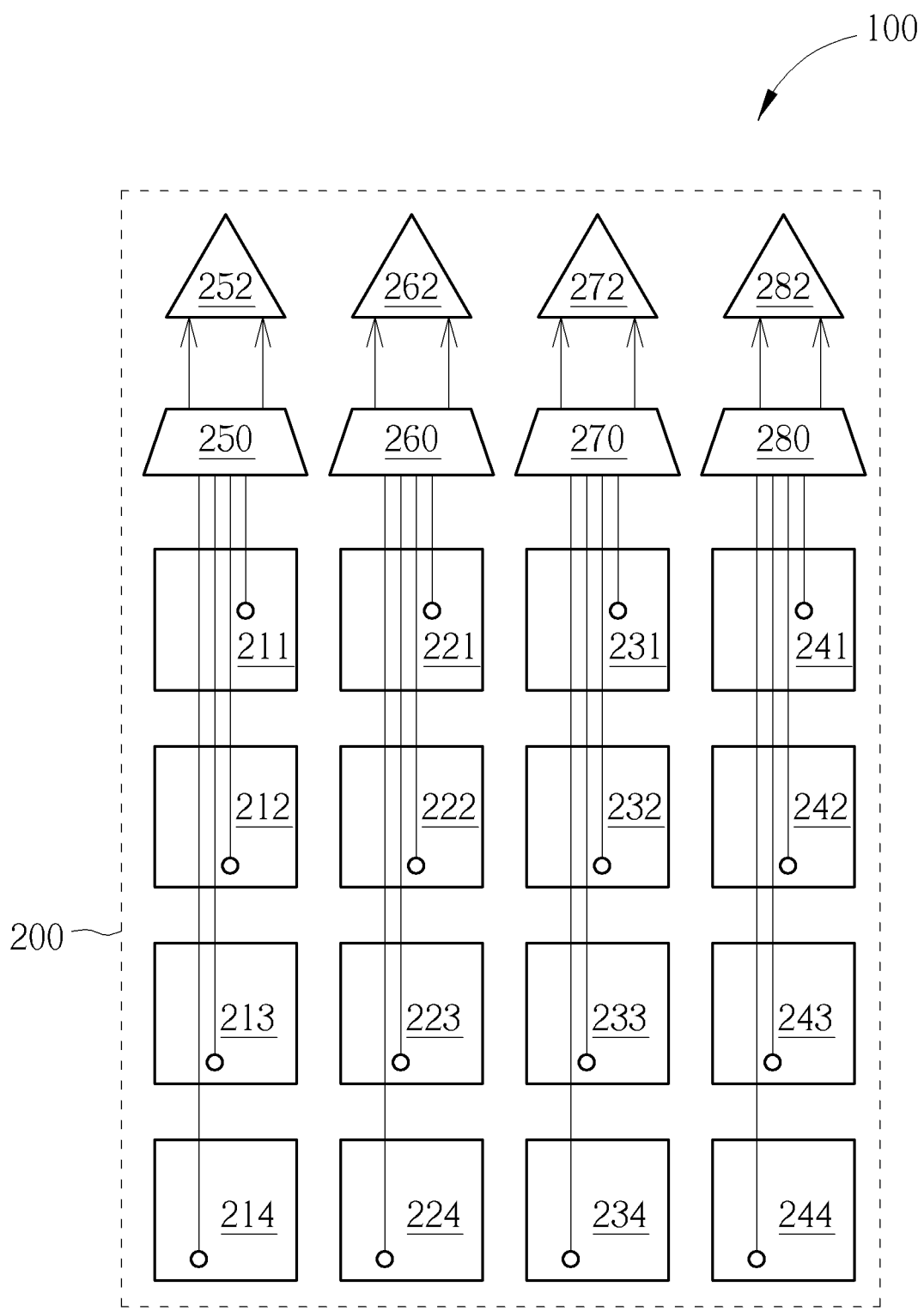
FIG. 1 shows a simplified block diagram of a conventional in-cell touch panel sensing system in a Touch and Display Driver Integration (TDDI) chip.
Figure 2:
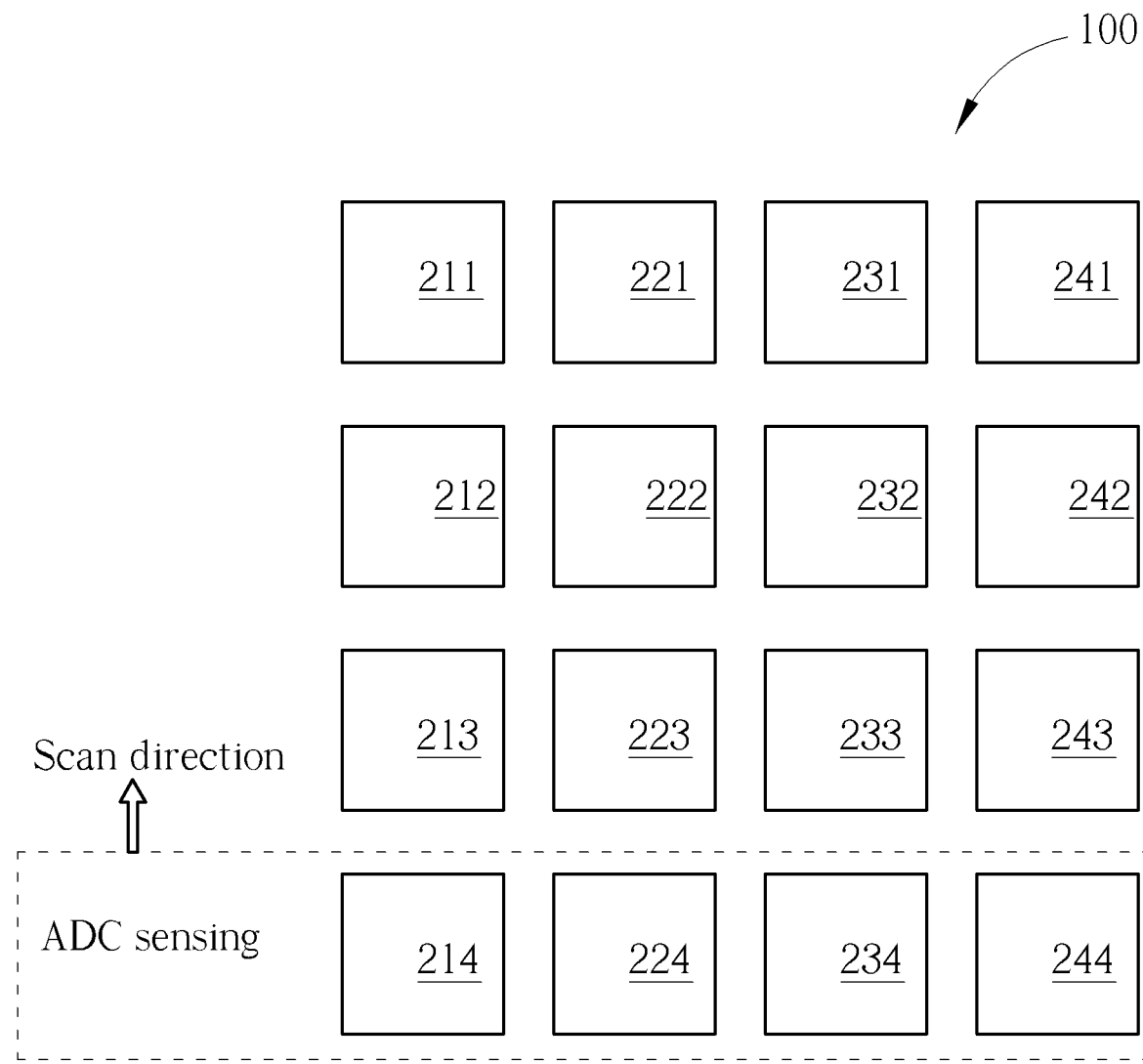
FIG. 2 shows a simplified block diagram of a sensing method of the conventional in-cell touch panel sensing system.
Figure 3:
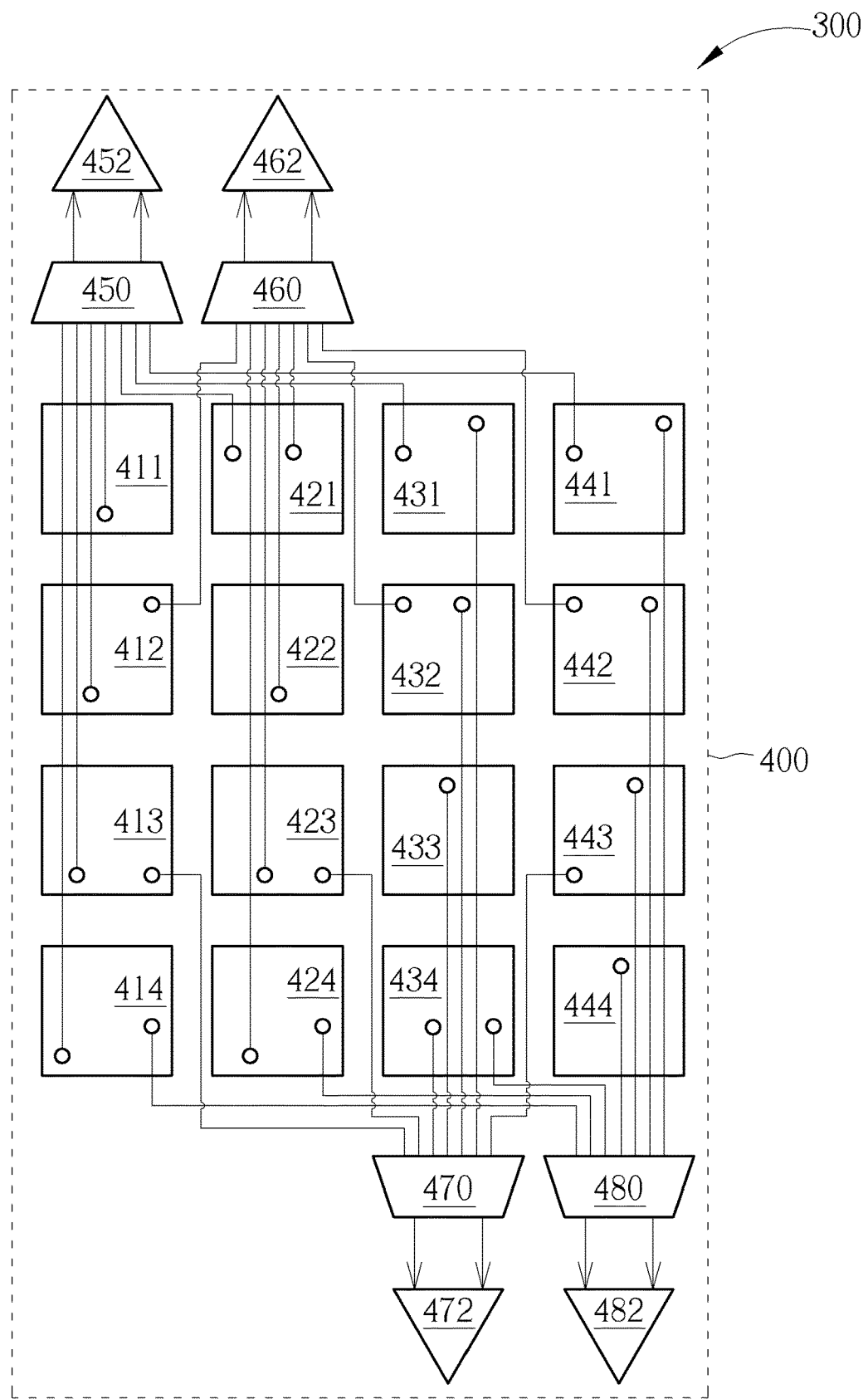
FIG. 3 shows a simplified block diagram of an in-cell touch panel sensing system in accordance with an embodiment of the present invention.

Please refer to FIG. 3. FIG. 3 shows a simplified block diagram of an in-cell touch panel sensing system 300 in accordance with an embodiment of the present invention, wherein the in-cell touch panel sensing system 300 can be applied to a Touch and Display Driver Integration (TDDI) chip, and the in-cell touch panel sensing system 300 can comprise a plurality of sensing arrays 400. In this embodiment, the in-cell touch panel sensing system 300 comprises 50 sensing arrays 400, and the TDDI chip is utilized for sensing a 240 Hz active pen and 120 Hz touch sensing. The sensing array 400 comprises: 16 sensor plates 411, 412, 413, 414, 421, 422, 423, 424, 431, 432, 433, 434, 441, 442, 443, 444, a first multiplexer (MUX) 450, a first analog-to-digital converter (ADC) 452, a second MUX 460, a second ADC 462, a third MUX 470, a third ADC 472, a fourth MUX 480, and a fourth ADC 482. The first MUX 450 is coupled to a first row of the sensor plates 411, 421, 431, 441 and a first column of the sensor plates 411, 412, 413, 414. The first ADC 452 is coupled to the first MUX 450. The second MUX 460 is coupled to a second row of the sensor plates 412, 422, 432, 442 and a second column of the sensor plates 421, 422, 423, 424. The second ADC 462 is coupled to the second MUX 460. The third MUX 470 is coupled to a third row of the sensor plates 413, 423, 433, 443 and a third column of the sensor plates 431, 432, 433, 434. The third ADC 472 is coupled to the third MUX 470. The fourth MUX 480 is coupled to a fourth row of the sensor plates 414, 424, 434, 444 and a fourth column of the sensor plates 441, 442, 443, 444. The fourth ADC 482 is coupled to the fourth MUX 480. Please note that the above embodiment is merely for an illustrative purpose and is not meant to be a limitation of the present invention. For example, the number of the sensing arrays can be changed according to different design requirements.

Figure 4:
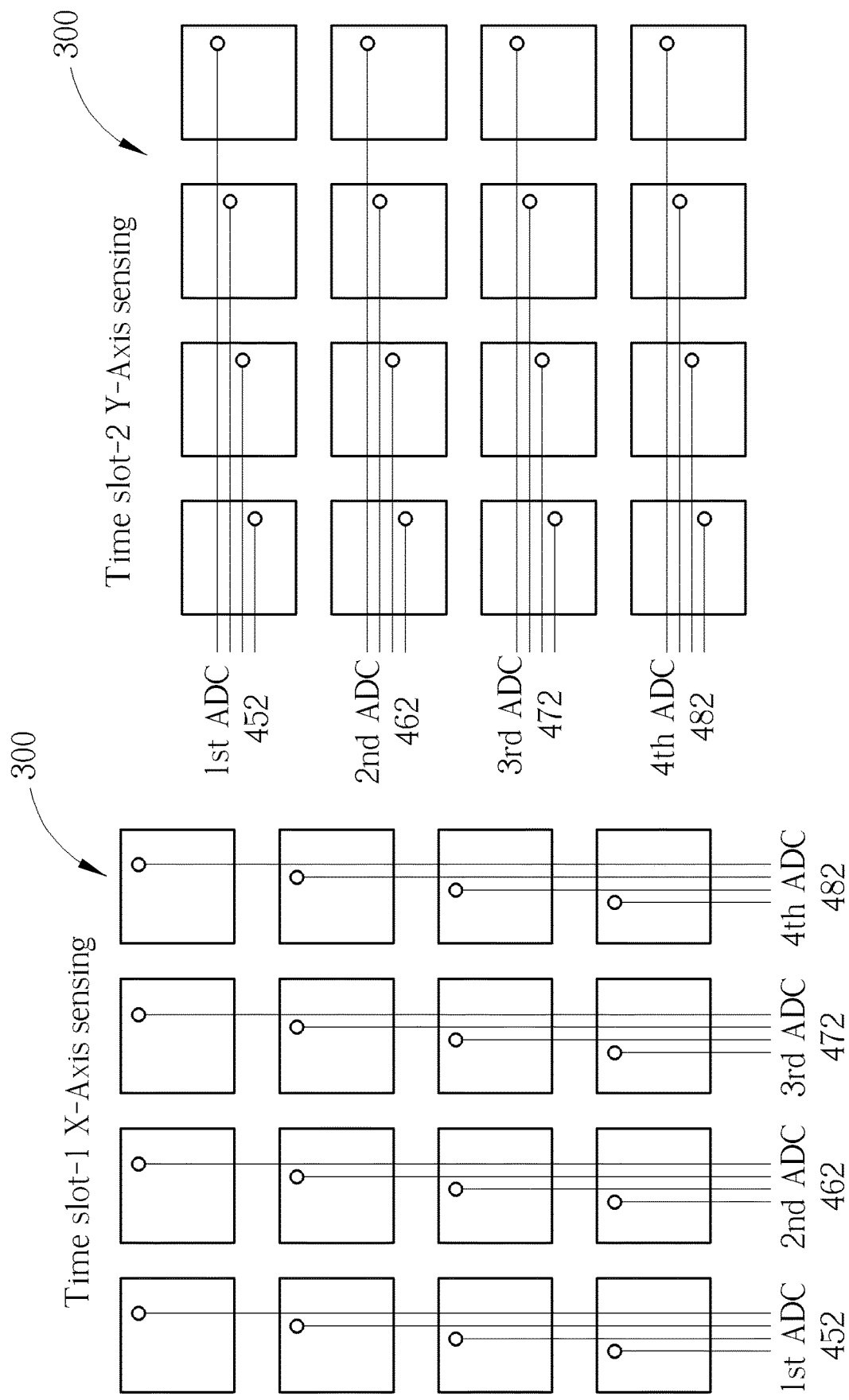
FIG. 4 shows a simplified block diagram of a sensing process of the in-cell touch panel sensing system in accordance with an embodiment of the present invention.

Please refer to FIG. 4. FIG. 4 shows a simplified block diagram of a sensing process of the in-cell touch panel sensing system 300 in accordance with an embodiment of the present invention. For example, when the in-cell touch panel sensing system 300 performs a position sensing operation, the first ADC 452, the second ADC 462, the third ADC 472, and the fourth ADC 482 scan the first column of the sensor plates, 411, 412, 413, 414, the second column of the sensor plates, 421, 422, 423, 424, the third column of the sensor plates 431, 432, 433, 434, and the fourth column of the sensor plates 441, 442, 443, 444 simultaneously via the first MUX 450, the second MUX 460, the third MUX 470, and the fourth MUX 480 in a first time slot. Next, the first ADC 452, the second ADC 462, the third ADC 472, and the fourth ADC 482 scan the first row of the sensor plates 411, 421, 431, 441, the second row of the sensor plates 412, 422, 432, 442, the third row of the sensor plates 413, 423, 433, 443, and the fourth row of the sensor plates 414, 424, 434, 444 simultaneously via the first MUX 450, the second MUX 460, the third MUX 470, the third ADC 472, and the fourth MUX 480 in a second time slot. In other words, each ADC of the in-cell touch panel sensing system 300 can scan 4 sensor plates simultaneously in one time slot. That is, the first ADC 452, the second ADC 462, the third ADC 472, and the fourth ADC 482 perform X-axis sensing and Y-axis sensing and interpolate the positioning points with two time slots to complete the position sensing operation for one time.

In this way, the present invention can use a smaller amount of ADCs to complete a position sensing operation or reduce number of times of the time slot required in the position sensing operation with same amount of ADCs. For example, the in-cell touch panel sensing system 300 comprises 50 sensing arrays 400, and each sensing array 400 comprises 16 sensor plates, and thus the in-cell touch panel sensing system 300 comprises 800 sensor plates. Compared with the prior art, the present invention only requires 200 ADCs to complete the position sensing operation for one time. Moreover, compared with the prior art, the present invention only requires 2 time slots to complete the position sensing operation for one time with same amount of ADCs. If one time slot is 200 ms, then the prior art needs to spend 800 ms to complete the position sensing operation for one time, and the present invention only requires 400 ms to complete the position sensing operation for one time. Thus, the present invention also can reduce the required time of the position sensing operation.

Please refer to FIG. 5. FIG. 5 show a flowchart of a sensing method for the in-cell touch panel sensing system 300 in the above embodiment of the present invention. Provided that substantially the same result is achieved, the steps of the process flowchart do not have to be in the exact order shown in FIG. 5 and need not be contiguous, meaning that other steps can be intermediate or certain steps can be ignored. The sensing method comprises the following steps:

Step 500: Utilize the first ADC, the second ADC, the third ADC, and the fourth ADC to scan the first column of the sensor plates, the second column of the sensor plates, the third column of the sensor plates, and the fourth column of the sensor plates simultaneously in a first time slot.

Step 510: utilizing the first ADC, the second ADC, the third ADC, and the fourth ADC scan the first row of the sensor plates, the second row of the sensor plates, the third row of the sensor plates, and the fourth row of the sensor plates simultaneously in a second time slot to complete a position sensing operation once.

Briefly summarized, the in-cell touch panel sensing system and a sensing method for the in-cell touch panel sensing system disclosed by the present invention can use a smaller amount of ADCs to complete a position sensing operation or reduce number of times of the time slot required in the position sensing operation with same amount of ADCs. Thus, the present invention also can reduce the required time of the position sensing operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An in-cell touch panel sensing system, comprising:

a plurality of sensing arrays, each sensing array comprising:
  a plurality of sensor plates;
  a first multiplexer (MUX), coupled to each of the sensor plates in a first row and to each of the sensor plates in a first column;
  a first analog-to-digital converter (ADC), coupled to the first MUX;
  a second MUX, coupled to each of the sensor plates in a second row and to each of the sensor plates in a second column;
  a second ADC, coupled to the second MUX;
  a third MUX, coupled to each of the sensor plates in a third row and to each of the sensor plates in a third column;
  a third ADC, coupled to the third MUX;
  a fourth MUX, coupled to each of the sensor plates in a fourth row and to each of the sensor plates in a fourth column; and
  a fourth ADC, coupled to the fourth MUX.

2. The in-cell touch panel sensing system of claim 1, wherein each row of the sensor plates comprises four sensor plates, and each column of the sensor plates comprises four sensor plates.

3. The in-cell touch panel sensing system of claim 1, wherein the first ADC, the second ADC, the third ADC, and the fourth ADC scan the first column of the sensor plates, the second column of the sensor plates, the third column of the sensor plates, and the fourth column of the sensor plates simultaneously in a first time slot.

4. The in-cell touch panel sensing system of claim 1, wherein the first ADC, the second ADC, the third ADC, and the fourth ADC scan the first row of the sensor plates, the second row of the sensor plates, the third row of the sensor plates, and the fourth row of the sensor plates simultaneously in a second time slot.

5. The in-cell touch panel sensing system of claim 1, wherein the first ADC, the second ADC, the third ADC, and the fourth ADC use two time slots to complete a position sensing operation once.

6. The in-cell touch panel sensing system of claim 1, applied to a Touch and Display Driver Integration (TDDI) chip.

7. The in-cell touch panel sensing system of claim 6, wherein the TDDI chip is utilized for sensing a 240 Hz active pen and 120 Hz touch sensing.

8. A sensing method for the in-cell touch panel sensing system of claim 1, comprising:
  utilizing the first ADC, the second ADC, the third ADC, and the fourth ADC to scan the first column of the sensor plates, the second column of the sensor plates, the third column of the sensor plates, and the fourth column of the sensor plates simultaneously in a first time slot; and
  utilizing the first ADC, the second ADC, the third ADC, and the fourth ADC scan the first row of the sensor plates, the second row of the sensor plates, the third row of the sensor plates, and the fourth row of the sensor plates simultaneously in a second time slot to complete a position sensing operation once.

9. The sensing method of claim 8, applied to a Touch and Display Driver Integration (TDDI) chip.

10. The sensing method of claim 9, wherein the TDDI chip is utilized for sensing a 240 Hz active pen and 120 Hz touch sensing.

* * * * *